United States Patent [19]

Kramer

[11] Patent Number: 4,773,771
[45] Date of Patent: Sep. 27, 1988

[54] BEARING ASSEMBLY

[75] Inventor: James H. Kramer, Akron, Ohio

[73] Assignee: The B. F. Goodrich Company, Akron, Ohio

[21] Appl. No.: 118,818

[22] Filed: Nov. 9, 1987

[51] Int. Cl.$^4$ ............................................. F16C 27/06
[52] U.S. Cl. ..................................... 384/98; 384/125
[58] Field of Search ................... 384/97, 98, 100, 114, 384/118, 119, 125, 904, 300, 309, 624

[56] References Cited

U.S. PATENT DOCUMENTS

| | | | |
|---|---|---|---|
| 2,380,715 | 7/1945 | Aker | 384/98 |
| 3,932,004 | 1/1976 | Orndorff, Jr. | 384/97 |
| 4,473,308 | 9/1984 | Kramer | 384/98 |
| 4,577,379 | 3/1986 | Kramer | 29/149.5 S |
| 4,607,964 | 8/1986 | Kramer et al. | 384/98 |
| 4,725,151 | 2/1988 | Orndorff, Jr. | 384/98 |

Primary Examiner—John Petrakes
Assistant Examiner—Thomas R. Hannon
Attorney, Agent, or Firm—Joseph Januszkiewicz

[57] ABSTRACT

A bearing assembly for supporting a drive shaft, having a housing with a central bore in which is mounted a shell with a plurality of circumferential spaced staves defining water courses therebetween. Each of the staves have an outer layer made of an ultra high molecular weight polyethylene material and an inner layer made of an elastomeric material. The inner layer is grooved to receive a thin layer of low friction material such that surface of the low friction material is below the plane of the inner layer.

6 Claims, 2 Drawing Sheets

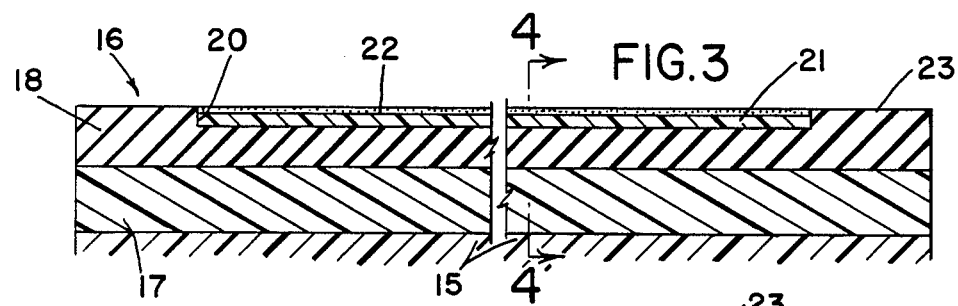
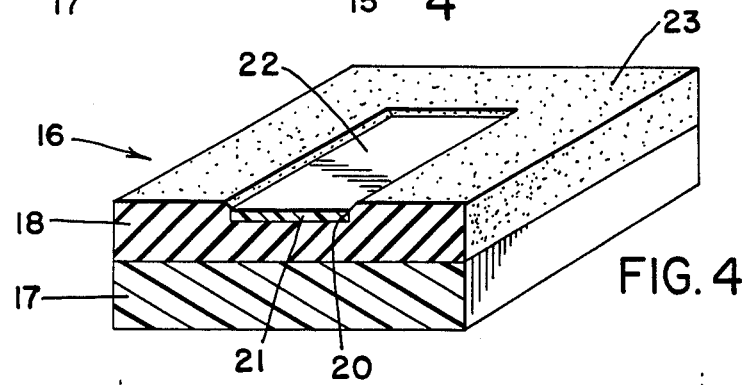
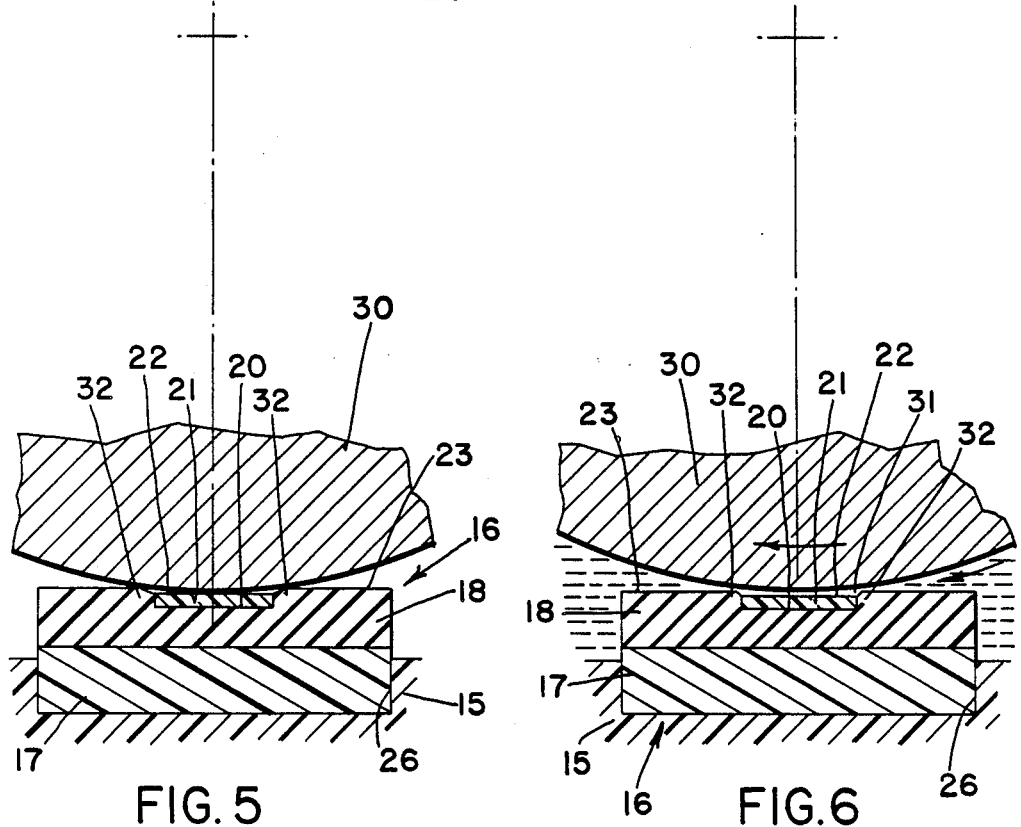

BEARING ASSEMBLY

BACKGROUND OF THE INVENTION

This invention relates to a bearing support or assembly and more particularly to an elastomeric bearing assembly which is adapted for use in supPorting marine propeller shafts which effectively supports the shaft in a wet running condition as well as in a dry slow running or starting condition. Elastomeric journal bearings have been found to be particularly suited for wet running conditions because of their exceptional ability to withstand the effects of corrosive fluids and to withstand the effects of abrasion from foreign materials which are carried in suspension in the sea water or other liquids in which the shaft and journal bearing assembly operates. Such elastomeric journal bearing assemblies have been made and are still being made with either rigid metallic support members or plastic support materials. A further advantage of the elastomeric journal bearings is that since they operate in a liquid medium they are self lubricated and therefore highly desirable for marine use as for the stern propeller shaft journals. One particular problem to the use of such elastomeric bearing assemblies has been the high coefficient of friction of dry rubber or elastomeric material during start up of rotation of the marine shaft. The attempts to solve this problem have been directed to pump water continuously to the bearing while rotating it continuously or to provide a new bearing assembly with movable parts to present different types of friction surfaces to the bearing shaft. In both instances, these measures increase the cost of operation or of producing the bearing assembly.

The present invention provides a new and improved elastomeric bearing assembly that utilizes a unique construction to permit the ease of starting the propeller shaft after a prolonged rest while simultaneously taking advantage of the unique properties of the rubber bearing surface under wet conditions to facilitate the support of the shaft and thus providing a very low coefficient of friction under either operating conditions. When rotating a metal shaft in a fluid lubricated bearing assembly, a pocket of fluid is formed at the lower portions of the supported shaft where the shaft comes into contact with spaced flat adjacent surfaces of the rubber surfaces. Such pockets of fluids when formed act as water wedges and raise the shaft from the elastomeric shaft interfaces and provide lubrication to the shaft. The present invention enhances the hydraulic fluid pocket while utilizing a low friction material upon which the propeller shaft can rest during start up. The unique structure enhances both features while retaining a cost effective structure and also reduces power consumption.

SUMMARY OF THE INVENTION

The present invention is directed to a new and improved bearing assembly having a rigid non-metallic outer shell supporting a plurality of circumferentially spaced staves wherein each stave is constructed from a semi-rigid material such as an ultra high molecular weight polyethylene which is bonded to an inner strip of an elastomer. Each elastomeric strip is recessed along its longitudinal length, which recess receives a thin layer of a low friction material such as Teflon ® or ultra high molecular weight material. The upper bearing surface of the thin layer is lower than the upper adjacent surfaces of the elastomeric strip in which such thin layer is mounted.

BRIEF DESCRIPTION OF THE DRAWINGS

FIG. 3 is a further enlarged cross sectional view taken of a single bearing strip or stave on line 3—3 of FIG. 2;

FIG. 4 is a perspective view of a portion of a single bearing strip taken on line 4—4 of FIG. 3;

FIG. 5 is an enlarged cross-sectional view of a portion of the propeller shaft and a single bearing strip in a non running condition;

FIG. 6 is an enlarged cross-sectional view of a portion of the propeller shaft and a single bearing strip in a running condition.

DETAILED DESCRIPTION

Figure 1:
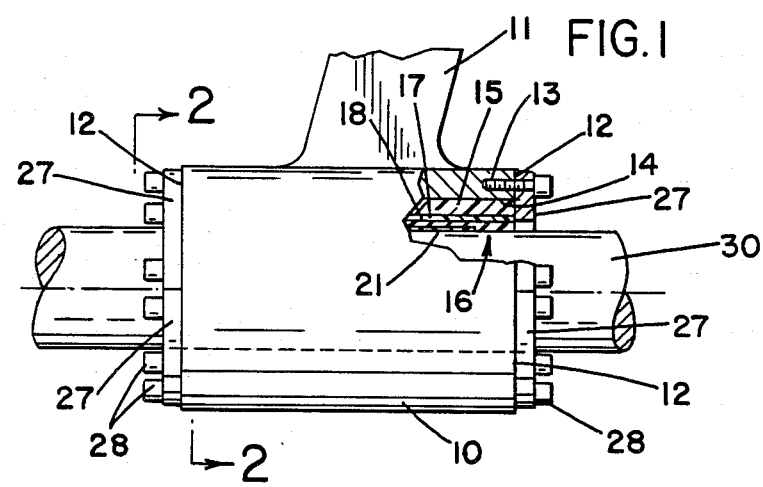
FIG. 1 is a fragmentary side elevational view of a strut and bearing assembly for supporting a rotatable shaft such as a propeller shaft with a portion of the housing and bearing assembly broken away to illustrate the bearing assembly.
Figure 2:
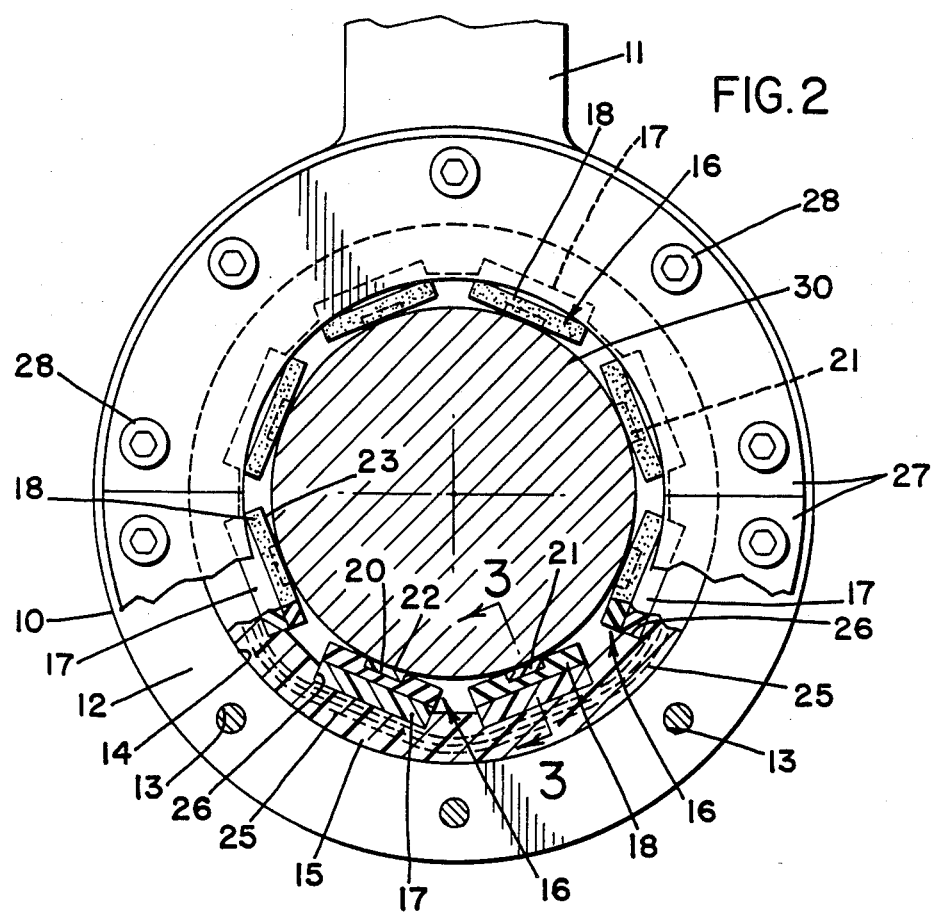
FIG. 2 is an enlarged front elevational view of the strut and bearing assembly taken on line 2—2 of FIG. 1 with a portion of the cap broken away as well as the outer shell to illustrate the relationship of the bearing elements and the shaft.

The invention according to a presently preferred embodiment will be described with reference to the accompanying drawings wherein like reference numerals designate like or corresponding parts throughout the several views. There is shown in FIG. 1 a longitudinally extending bearing housing 10 supported by a strut 11. Housing 10 has a pair of spaced annular end surface 12, with threaded bores 13 extending into the housing. The housing 10 has a central bore 14 to accommodate a bearing unit to be described. The bearing unit has an outer cylindrical shell 15 which receives a plurality of circumferentially spaced bearing staves 16. Each stave 16 includes a rectangular bearing support element or backing support 17 made from a high quality non-corroding, ultra high molecular weight polyethylene. Suitably bonded to each support bearing element 17 is an elastomeric bearing element 18.

An elastomer is defined as a substance that can be stretched at room temperatures to at least twice its original length and, after having been stretched and the stress removed, returns with force to approximately its original length in a short time (see Glossary of Terms as prepared by ASTM Committee D11 on Rubber and Rubberlike Materials published by the American Society for Testing Materials).

The elastomeric or rubber material that can be used can be any of the well known elastomers including for example natural rubber, copolymers of butadiene and acrylonitrile, copolymers of butadiene and styrene, copolymers of butadiene and alkyl acrylates, butyl rubber, olefin rubbers such as ethylene-propylene and EPDM rubber, fluorocarbon rubbers, fluoroisilicone rubbers, silicone rubbers, chlorosulfonated polyethylene, polyacrylates polybutadiene, polychloroprene and the like. Each elastomeric bearing element 18 has a groove or depression 20 which receives a relatively thin layer or strip 21 of low friction material such as Teflon ® or ultra high molecular weight polyethylene. The uppermost surface 22 of the low friction layer or strip 21 is lower relative to the smooth adjacent surface of elastomeric bearing element 18 as clearly depicted by FIGS. 3 and 4. The layer 21 of low friction material is located along center of each bearing element 18 and is approximately one-third of the width of such element 18. In plan view, each elastomeric bearing element is substantially rectangular in shape with the low friction layer 21 extending along its longest length for reasons to be described.

The bearing support element 17 is made of ultra high molecular weight polyethylene having a melt flow index less than 0.15 and adhered to the elastomeric bearing 18 with its thin layer 21 of low friction material. To prepare the bearing assembly a plurality of staves 16 are placed on a polygonal shaped mandrel and maintained thereon in any manner known in the art as by pulling a vacuum such that as the mandrel and staves are rotated a woven fabric of fiberglass designated 25 is wrapped or wound onto the outer peripheral surfaces of the staves to form the cylindrical shell 15. Such wrapping is done to fill the voids or recesses between adjacent staves. The wrapping is continued until a cylindrical shell 15 is formed. As the fabric is wrapped an epoxy resin is impregnated into the fabric such that as the overwrapping of the fabric continues the epoxy resin is built up and a groove 26 is formed in the shell 15. The epoxy resin can be sprayed or fed from a suitable reservoir or supply source onto the fabric and with the aid of a doctor blade a uniform coating is placed onto the fabric. The epoxy resin can be applied manually or by any known mechanical means. To fill the initial void between the staves as the staves rest on a mandrel, the epoxy resin can be built up until the fabric can be easily wrapped around the staves. The number of layers of impregnated fiberglass that is applied around the outer surfaces of the circumferentially spaced staves 16 is determined by the desired size needed. After the epoxy resin has set, the outer surface can be machined to the desired diameter to form the outer cylindrical shell 15.

A specific example of the epoxy resin useful in the present invention is one by the tradename "APCO" available from Applied Plastics Co., Inc. of 612 Franklin Avenue, El Segundo, CA 90245. The epoxy resin has a specific gravity of 1.165 and its accompanying curing agent or hardener has a specific gravity of 1.809. The epoxy resin has a shore D 25° C. hardness of 84 with a glass transition temperature of 196° F. The viscosity of the epoxy resin is 2000 cps (1800+300); while the viscosity of the hardener is 410 cps (310+200). Another epoxy resin that can be used is one known as "EVERFIX EPOXY RESIN" having a density of 8.5 lbs. per gallon. The hardner used with such epoxy resin is a modified aliphatic amine adduct available through Fibre Glass-Ever Cost Co., Inc. 66700 Cornell Road, Cincinnati, Ohio 45242.

The outer shell 15 and the staves 16 are located within the central bore 14 of the housing 10 such that the respective sides abut a pair of semi-circular retainer rings 27 which are secured to the end sections of the cylindrical shaped housing 10. Rings 27 have a plurality of circumferentially spaced bores which receive cap screws 28 which in turn are threaded into the respective threaded bore 13 to securely fasten the bearing unit within housing 10 with the respective staves 16 surrounding a propeller shaft 30.

As seen in FIG. 5, a metal propeller shaft 30, which is at rest, is supported by the staves 16 and frictionally contacts the surfaces of the low friction strips 21. At start up, when there is little lubricating fluids, the coefficient of friction of the metal propeller shaft on the low coefficient of frictional material layer or strip 21 is lower than the conventional metal shaft on the rubber bearing elements and thus provides a lower break away force. As the speed of the shaft 30 increases, the preformed pocket, space or gap 31 between the strip 21 and the shaft 30 fills with fluid and proves a hydrodynamic film. Such pocket is facilitated by the surface 22 of strip 21 being lower than the adjacent plane or surface 23 of the elastomeric bearing element 18. As the speed of rotation of shaft 30 increases the preformed pocket 31 builds up and the rotating shaft rides on this film since a dam is formed between adjacent portions or edges 32 (FIG. 6) of the elastomeric bearing element 18 and the shaft 30.

Various modifications are contemplated and may be resorted to by those skilled in the art without departing from the described invention, as hereinafter defined by the appended claims, as only a preferred embodiment thereof has been disclosed.

I claim:

1. A bearing assembly having a housing with a central bore therein, a cylindrical plastic shell located in said central bore of said housing, said shell having a central opening therein with a central axis, a plurality of circumferentially spaced staves mounted in said shell and extending into said central opening, said staves being generally rectangular in shape and extending longitudinally parallel to said central axis, each stave having a radially disposed outer layer of ultra high molecular weight polyethylene material and a radially disposed inner layer made from an elastomer, each of said inner layers having a flat surface with a groove extending centrally in a direction parallel to said central axis, a thin layer of low coefficient friction material in each of said grooves and bonded to said inner layers, the radially innermost surface of each elastomeric layer is radially inwardly a greater distance than the radially innermost surface of each of said thin layer of low coefficient material, and retainer means mounted on said housing and operative to retain said cylindrical shell and staves in said bearing assembly.

2. A bearing assembly as set forth in claim 1 wherein each of said staves has a clearance pocket between said thin layer of low coefficient material and adjacent portions of elastomeric material to facilitate forming a water pocket thereby.

3. A bearing assembly as set forth in claim 2 wherein each thin layer of low coefficient material has a flat innermost surface.

4. A bearing assembly as set forth in claim 3 wherein each of said inner layers of elastomer is rectangular in plan view with a width and a length, said length extending in a direction parallel to said central axis, each of said thin layers of low coefficient of material having a width that is approximately one third the width of said rectangular layer of elastomer.

5. A bearing assembly having a housing with a central bore therein, a cylindrical shell made of fiber fabric reinforced with a plastic resin with a central opening therethrough mounted in said bore of said housing, a plurality of circumferentially spaced staves mounted in said shell and projecting into said central opening, each of said staves having a radially disposed outer layer and a radially disposed inner layer, retaining means mounted on said housing and operative to secure said shell and said staves in said central bore, said outer layer of each of said staves made of an ultra high molecular weight polyethylene, each of inner layers is made of an elastomeric material that is bonded to said outer layer, each of inner layers has a flat radially innermost surface, and all of said inner layers have a groove extending from said flat surface radially into said elastomeric material, a thin layer of low friction material bonded to said elastomeric material, and the radial innermost surface of each of said thin layers extending along a plane radially outwardly of a plane containing said flat innermost surface of said elastomeric layer to provide a pocket and define a differential height difference at the junctures of said thin layer of low friction material with said elastomeric layer.

6. A bearing assembly as set forth in claim 5 wherein each of said staves has a pair of side surfaces that are spaced from adjacent side surfaces of adjacent staves to define a clearance space for a water course, and said differential height differences further defining clearance spaces to define other water courses.

* * * * *